(12) United States Patent
Sahinoglu

(10) Patent No.: US 8,259,699 B2
(45) Date of Patent: Sep. 4, 2012

(54) METHOD AND SYSTEM FOR TARGET POSITIONING AND TRACKING IN COOPERATIVE RELAY NETWORKS

(75) Inventor: Zafer Sahinoglu, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 432 days.

(21) Appl. No.: 12/351,588

(22) Filed: Jan. 9, 2009

(65) Prior Publication Data

US 2010/0177681 A1 Jul. 15, 2010

(51) Int. Cl.
- *H04J 3/00* (2006.01)
- *G01S 3/02* (2006.01)
- *H04W 4/00* (2009.01)
- *H04W 24/00* (2009.01)

(52) U.S. Cl. ...... 370/345; 370/338; 342/450; 455/456.2

(58) Field of Classification Search .................. 370/328, 370/338, 345, 445, 252, 255, 256; 455/456.1–456.6, 455/440, 456; 701/213–216, 300–302, 207; 342/450–465
See application file for complete search history.

(56) References Cited

U.S. PATENT DOCUMENTS

| | | | | |
|---|---|---|---|---|
| 6,665,333 B2 * | 12/2003 | McCrady et al. | ............ | 375/147 |
| 2006/0267841 A1 * | 11/2006 | Lee et al. | ...................... | 342/463 |
| 2009/0280836 A1 * | 11/2009 | Chou | ......................... | 455/456.5 |
| 2010/0265888 A1 * | 10/2010 | Kim et al. | ..................... | 370/328 |

* cited by examiner

*Primary Examiner* — Aung S Moe
*Assistant Examiner* — Habte Mered
(74) *Attorney, Agent, or Firm* — Dirk Brinkman; Gene Vinokur

(57) ABSTRACT

A method and system locates a position of a transceiver in a cooperative relay network of nodes. A primary node broadcasts a range request (RREQ) message. A target node, in response to receiving the RREQ message, broadcasts a range reply (RREP) message, wherein the RREP message includes a time difference between receiving the RREQ message and broadcasting the RREP message. A secondary node, in response to receiving the RREQ message and the RREP message, broadcasts a range data (RDAT) message, wherein the RDAT message includes a time difference between receiving the RREQ message and the RREP message. Then, a position solver can determine a location of the target node based on the time differences in the RREP message and the RDAT message.

11 Claims, 6 Drawing Sheets

200

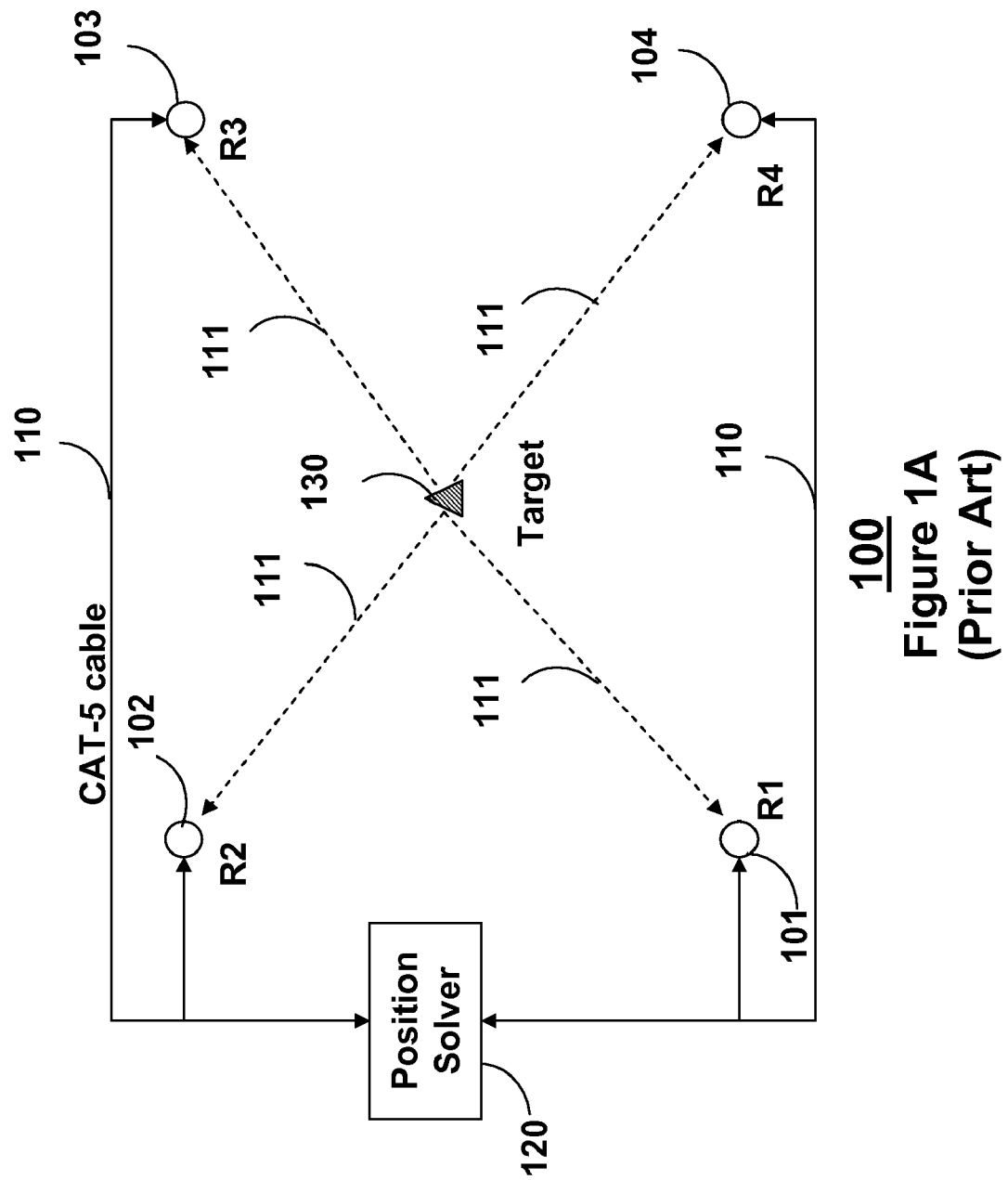

190

200

300

METHOD AND SYSTEM FOR TARGET POSITIONING AND TRACKING IN COOPERATIVE RELAY NETWORKS

FIELD OF THE INVENTION

This invention is related, in general, to positioning and tracking systems, and in particular to real time positioning and tracking (RTLS) in cooperative networks.

BACKGROUND OF THE INVENTION

Real-time location systems (RTLS) can be used to locate and track people and objects. The global positioning system (GPS) provides accuracy in the order of meters. However, GPS does not work indoors, has a high non-line of sight (NLoS) errors, and a long acquisition time, see S. Gezici, "A survey on wireless position estimation," Wireless Personal Communications," Special Issue on Towards Global and Seamless Personal Navigation, vol. 44, no. 3, pp. 263-282, February 2008. Therefore, alternative systems are used for indoor localization and tracking.

As shown in FIG. 1A, a RTLS for indoor use is implemented as a network of devices. The RTLS includes a transmit-only target device 130, and time synchronized anchor devices 101-104s to measure time difference of arrival (TDoA) of radio signals. The TDOA system includes multiple anchor devices (Ri) 101-104 with known positions and a position solver 120, see G. Sun, J. Chen, W. Guo, and K. J. Ray Liu, "Signal Processing Techniques in Network Aided Positioning," IEEE Signal Proc. Magazine, v. 22, n. 4, pp. 12-23, July 2205, D. Kelly and G. Shreve and D. Langford, "Fusing communications and Positioning-Ultrawideband offers exciting possibilities," Time Domain Corporation, August 1998, R. Fontana and S. J. Gunderson, "Ultrawideband precision asset location system," In Proc. IEEE Conf. on Ultrawideband Syst. and Technol. (UWBST), May 2002, pp. 147-150, and R. J. Fontana, "Experimental results from an ultrawideband precision geolocation system," Multispectral Solutions, Inc., pp. 1-6, May 2000. The reference devices are synchronized by timing signals via a category-5 (CAT-5) twisted pair cable 110. The devices can also synchronize and communicate with the position solver 120 using the same cable 110.

The target device periodically broadcasts a beacon 111. The reference devices record and forward the time of arrival of the beacons 111 to the position solver 120. The position solver 120 typically uses a non-linear optimization procedure to estimate the location of the target device 130. In a practical application, thousands of targets can be used because the signaling traffic volume requirements are quite low. However, a high cost of installation and calibration impede large-scale deployment.

FIG. 1B shows a two-way time-of-arrival (TW-ToA) RTLS 140 with better accuracy than the TDoA system 100 of FIG. 1A. The TW-ToA 140 does not require synchronization as the TDoA system above, see J-Y. Lee and R. A. Scholtz, "Ranging in a dense multipath environment using an UWB radio link," IEEE Journal on Selected Areas in Communications, vol. 20, no. 9, pp. 1677-1683, December 2002, and Z. Sahinoglu, S. Gezici, "Ranging in the IEEE 802.15.4a Standard," In Proc. IEEE Wireless and Microwave Tech. Conf. (WAMICON), Florida, pp. 1-5, May 2006.

In the TW-TOA based RTLS 140, the target device 130 unicasts range request messages 141-144 to reference devices 101-104. In response to receiving the range request messages, the reference devices transmit range reply message 151-154. Thus, the target receives multiple round-trip time measurements. Each round-trip time specifies a circle of possible positions. The intersection of the circles corresponds to the position of the target. Position solving can be done at the target 130 or at any of the reference devices.

FIG. 1C shows an alternative TW-TOA based RTLS system. Here, the signaling is initiated by transmitting range request messages 161-164 from reference devices 101-104 to the target 130. In response to receiving the requests, the target 130 broadcasts range reply messages 171-174. Then, the reference devices relay timing data (181-184) to the position solver 120. The TW-TOA systems have higher traffic volume requirement, and energy consumption is increased. This can be a serious problem in battery-operated positioning devices.

FIG. 1D shows a prior art mono-static radar system with bi-static receivers to determine the position of the target 130. A mono-static radar signal source R1 101 transmits a radar signal 191. The radar signal 191 reflects at the target 130 and is received at the source R1 101. This provides a round-trip time measurement that specifies a circle. The radar signal 191 and reflected signal 192 are also received by a bi-static receiver R2 102, which determines a time difference of arrival that specifies an ellipse. The intersection of the circle and the ellipse indicates the position of the target. As an advantage, this system does not require the cooperation of the target.

There are many cooperative localization schemes in the literature, but their particular emphasis is to increase the accuracy of initial position estimates either via information sharing among nodes that are being located, see C. Fretzagias, M. Papadopouli, "Cooperative Location-sensing for Wireless Networks," In Proc. Second IEEE Annual Conf. on Pervasive Computing and Commun. (PERCOM), March 2004, and Y. Shen, H. Wymeersch, and M. Z. Win, "Fundamental Limits of Wideband Cooperative Localization via Fisher Information," In Proc. IEEE Wireless Coomun. and Networking Conf. (WCNC), March 2007, pp. 3954-3958, or data fusion of multiple received signal strength (RSS), angle-of-arrival (AoA) and ToA measurements at multiple nodes, see C. L. F. Mayorga, F. D. Rosa, and S. A. Wardana, "Cooperative Positioning Techniques for Mobile Localization in 4G Cellular Networks," In Proc. IEEE Int. Conf. on Pervasive Services, July 2007, pp. 39-44, and T. Hui, W. Shuang, and X. Huaiyao, "Localization using Cooperative AOA Approach," In Proc. IEEE Int. Conf. on Wireless Commun., Networking and Mobile Computing (WiCOM), September 2007, pp. 2416-2419. A. T. Ihler, J. W. Fisher, R. L. Moses, and A. S. Willsky, "Nonparametric Belief Propagation for Self-localization of Sensor Networks," IEEE Journal on Selected Areas in Communications, vol. 23, no. 4, pp. 809-819, April 2005, describe a cooperative non-parametric belief propagation algorithm is developed to determine the infrastructure map.

Even though that approach suffers from mobility, it complements the current work, which assumes that the locations of the anchor nodes are known a-priori. Another complementary work, see N. A. Alsindi, K. Pahlavan, B. Alavi, and X. Li, "A Novel Cooperative Localization Algorithm for Indoor Sensor Networks," In Proc. 17th Annual IEEE Int. Symposium on Personal, Indoor and Mobile Radio Commun. (PIMRC), September 2006, pp. 1-6, describes introduces a distributed method to mitigate propagation of anchor location estimation errors. It is also possible to use the position estimates obtained by means of the current cooperative algorithm to initialize those methods.

Radar systems that having simultaneous mono-static and bi-static modes of operation are described by R. Braff, "Ranging and Processing Mobile Satellite," IEEE Trans. on Aerospace and Electronic Systems, vol. 24, no. 1, pp. 14-22, January 1988. There, the target is non-cooperative. In other words, the signals reflect back from the target without inducing and turn-around time. In communication systems, turn around time dominates the propagation time. Therefore, target cooperation is needed.

The above described systems either suffer from high energy consumption and low traffic capacity (for TW-TOA), or high deployment and infrastructure cost (for TDOA). Each air transmission and reception consumes energy. Therefore, minimizing transmissions reduces energy consumption of devices. Therefore, there is a need for an RTLS system with higher traffic efficiency than TW-TOA and lower deployment cost than TDOA.

SUMMARY OF THE INVENTION

Real-time location systems (RTLS) that are based on two-way time of arrival (TW-ToA) require at least three devices for triangulation based position estimation. This means at least six transmissions per position update.

The high traffic volume of the TW-ToA based systems limits both the number of targets and the position update rate, making them commercially less desirable than time difference if arrival (TDoA) systems.

The embodiments of the invention provide a positioning and tracking system and method that overcomes the overhead and scaling inefficiencies of conventional TW-ToA based trilateration approach by enabling 2D position estimates with as few as three transmissions.

While a primary node performs TW-TOA ranging with a target node, multiple, secondary nodes, which also receive these two-way ranging signals, contribute to position estimation by providing additional time of arrival (TOA) information.

The TW-TOA and TOA information is combined at a position solver node to improve accuracy of the estimate of the position of the target node, with respect to conventional RTLS systems that only use TW-TOA measurements.

BRIEF DESCRIPTION OF THE DRAWINGS

FIG. 1A is a schematic of a prior art positioning system using time difference of arrival information;

DETAILED DESCRIPTION OF THE PREFERRED EMBODIMENT

Figure 1B:
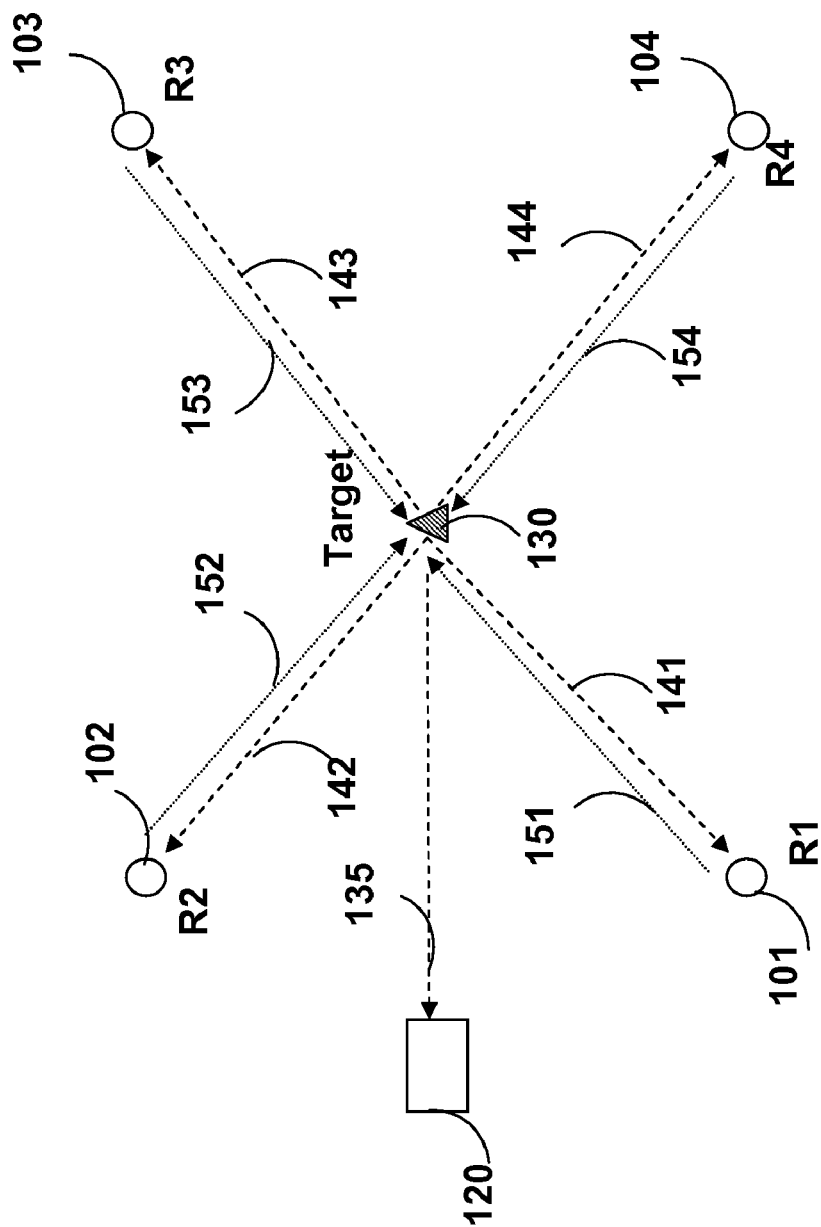
FIGS. 1B-1C are schematics of prior art positioning systems using two-way time of arrival signaling.
Figure 1C:
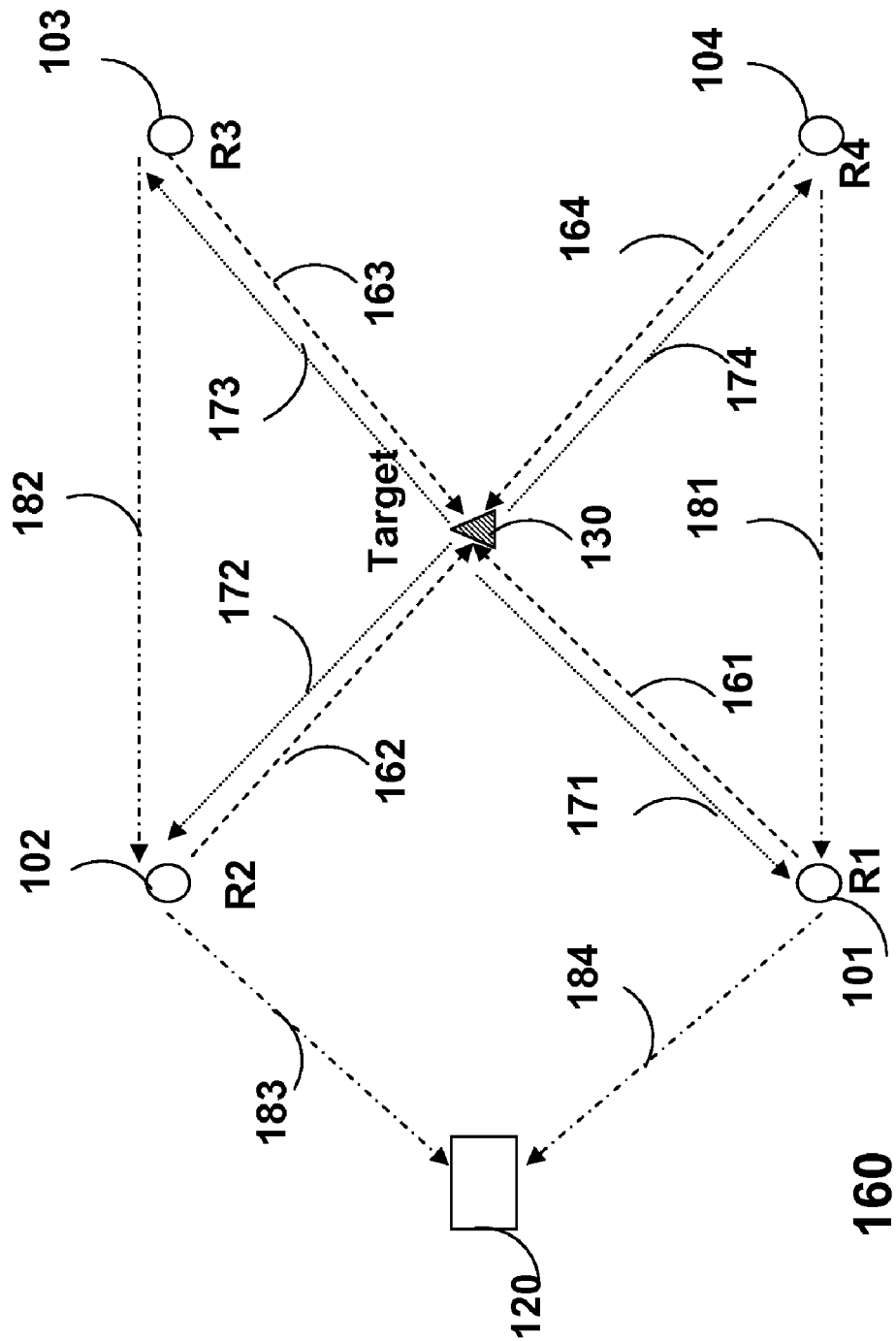
Figure 1D:
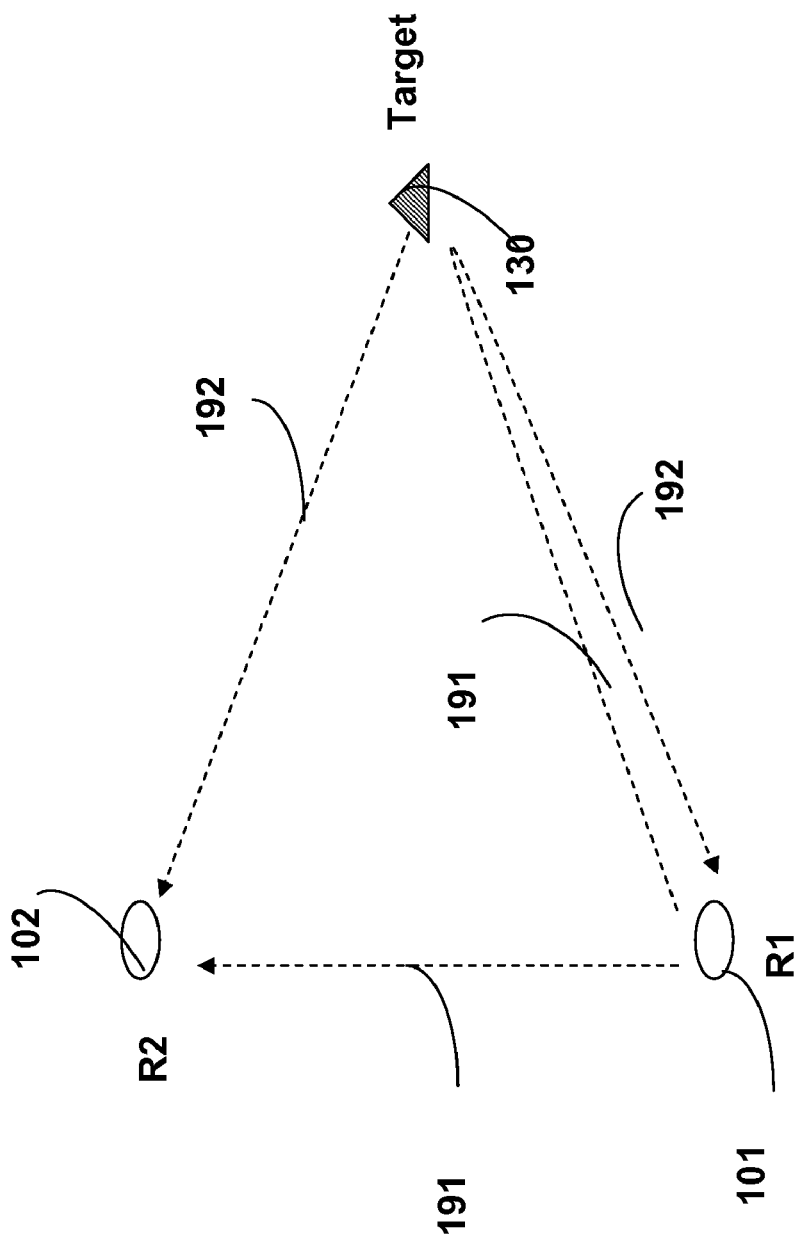
FIG. 1D is a schematic of a prior art positioning system using mono-static radar.
Figure 2:
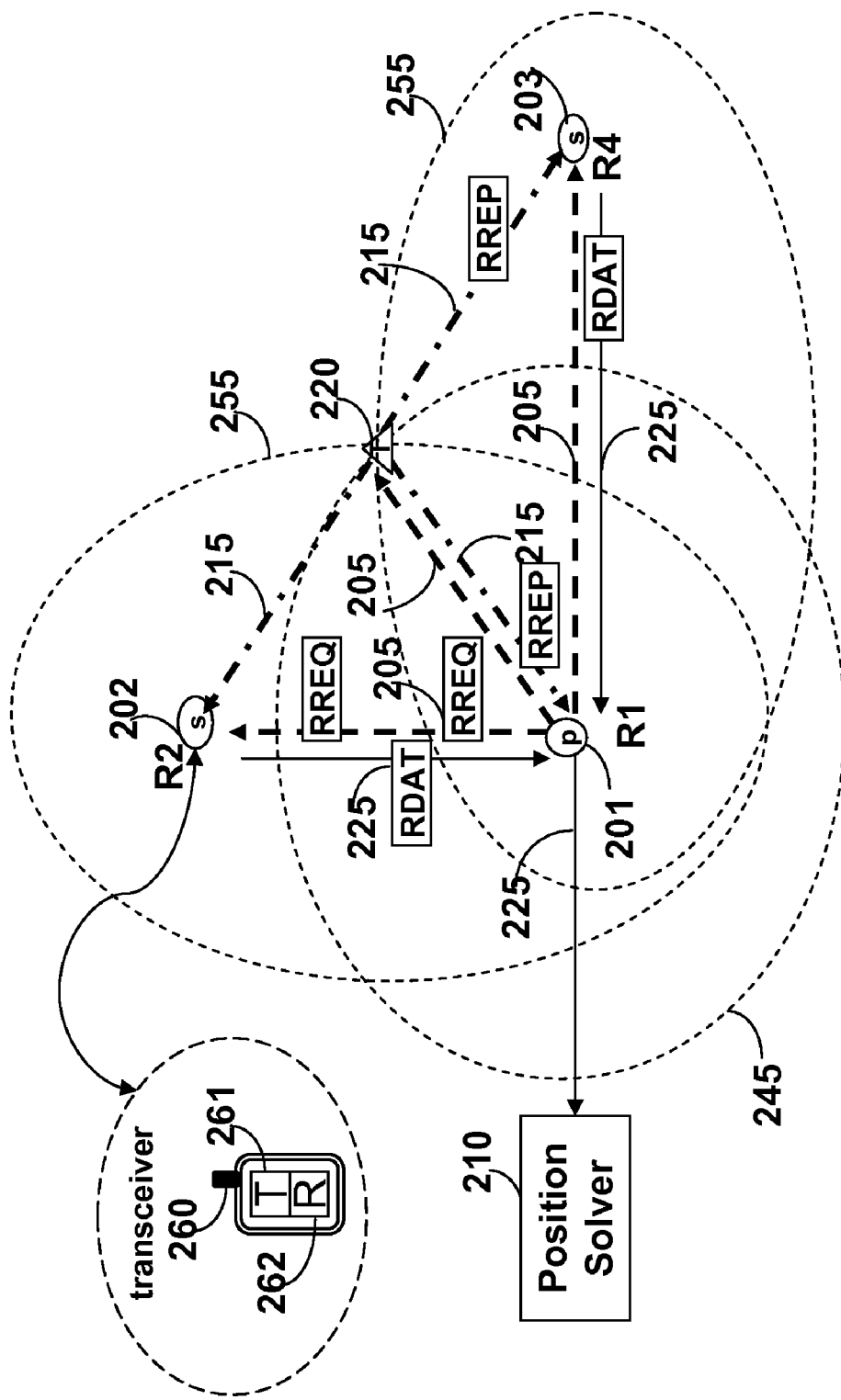
FIG. 2 is a schematic of a positioning system according to embodiments of the invention.

As shown in FIG. 2, a positioning system 200 according to embodiments of my invention is implemented in a network of cooperative wireless relay nodes. Each relay node, see inset, includes a transceiver 260 to transmit (T) 261 and receive (R) 262 positioning related messages as described herein.

In conventional relay networks, messages are transmitted via a single path between the nodes. In a cooperative relay network, the nodes cooperate with each other. By exploiting the broadcast nature of wireless channels, it is possible to reduce energy consumption in delivering the message. In cooperative relay networks as described herein, where batteries power the nodes, minimizing energy consumption is important to maximize a useful lifetime of the network.

The network includes a primary (P) node (R1) 201, secondary (S) nodes (R2, R3, R4) 202-203, a position solver node 210, and a target (T) node 220. Typically, the target node is a mobile relay node. The target node can be worn by a user, or attached to some object, e.g. a package or means for transportation in a distribution center. It is an object of the invention to determine the location of the target node, with respect to other nodes in the network. If the primary nodes are stationary at a known location, the locations of the target node can be determined in real-world coordinates to enable tracking the target node over time.

The system uses three types of messages: range request (RREQ) messages 205, range reply (RREP) messages 215, and range data (RDAT) messages 225.

The primary node 201 initiates ranging by broadcasting the RREQ message 205. In response to receiving the RREQ message 205, the target node 220 broadcasts the RREP message 215. The RREP message 215 includes a turn-around delay time, which is a time difference between receiving the RREQ message 205 and broadcasting the RREP message 215.

The secondary nodes 202-203 receive the RREQ message 205 and the RREP message 215 and measure the arrival times of the RREQ message and the RREP message to determine the time difference of arrival times (TDOA) of the RREQ message and RREP message, which are forwarded to the position solver 210 in RDAT messages 225.

It should be noted that the position solver 210 can be implemented in any of the nodes of the relay network. For example, the position solver can be in the target node, so that the target node can determine and track its own location. Alternatively, the position solver is implemented in a coordinator node, which controls an overall operation of the network.

Message Structures

Table I lists attributes and definitions of the fields in the various messages.

The messageType field identifies the message as RREQ, RREP or RDAT.

The localID field stores the network address of the node generating the message. For example, the localID for the RREQ message 205 stores the address of the primary node 201.

The sourceID and targetID fields identify the primary node and the target, respectively.

The sequenceNo field counts the number of position update requests that have occurred. The sequence number is only unique for the primary node. Therefore, to uniquely identify a particular positioning cycle, the three-tuple {sourceID, sequenceNo, targetID} is necessary.

The timedifference field in the RREP message is the time difference between receiving the RREQ message and broadcasting the RREP message. In the RDAT message, the timedifference field is the time difference between receiving the RREQ message and broadcasting the RREP 225 message as observed by the secondary node. This field is not used by the RREQ message.

TABLE I

| Attributes | Definitions |
| --- | --- |
| messageType | Identifies message type |
| localID | Address of node generating message |
| sourceID | Address of primary node |

TABLE I-continued

| Attributes | Definitions |
|---|---|
| targetID | Address of target node |
| sequenceID | Sequence for position updates |
| time difference | Time difference between RREQ and RREP at target if RREP |
| | Time difference between RREQ and RREP at secondary if RDAT |

Figure 3:
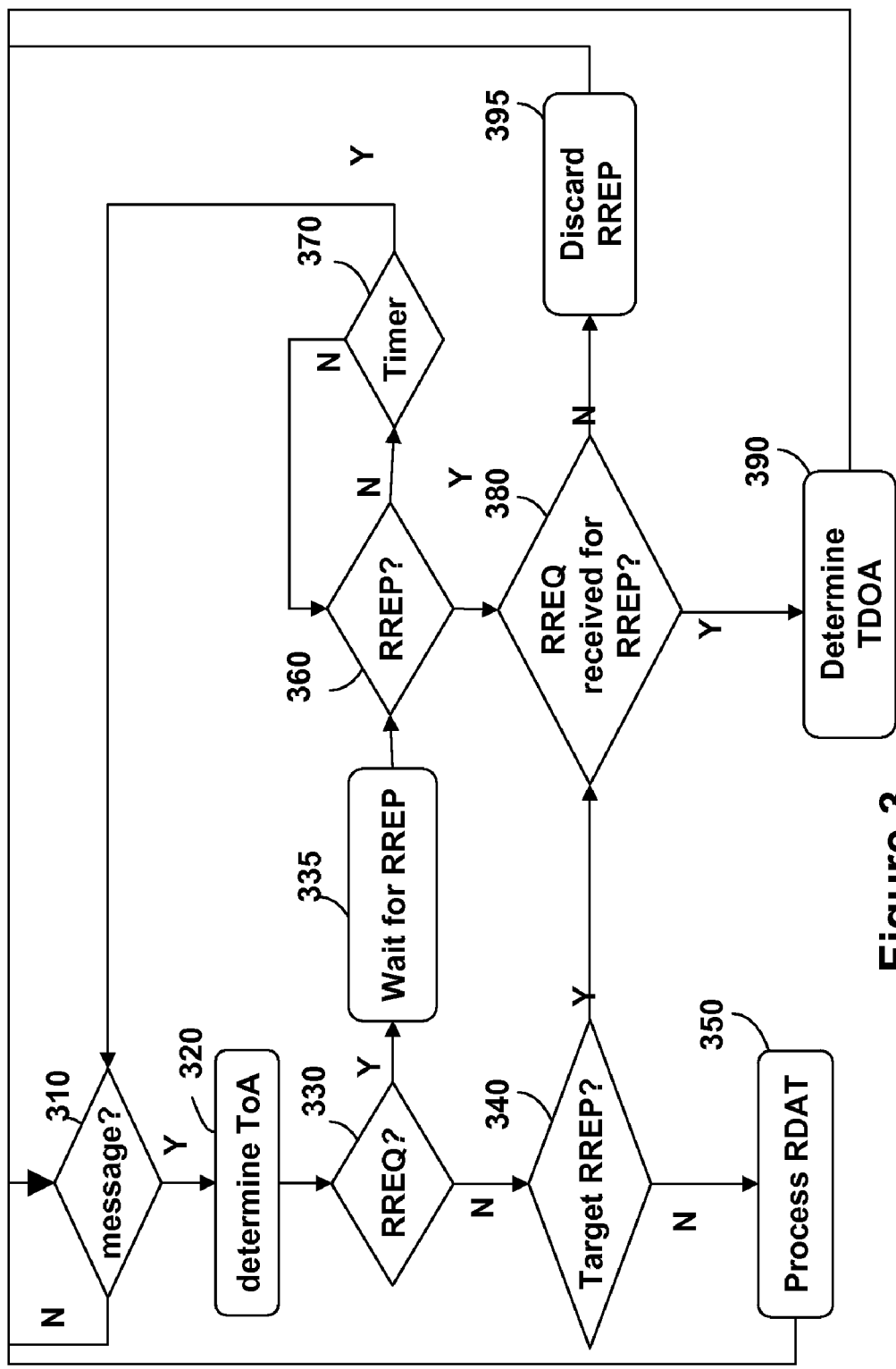
FIG. 3 is a flow diagram of method for operating the positioning system of FIG. 2 according to embodiment of the invention.

The processing at the primary node and target node is trivial. FIG. 3 shows the processing of the messages at the secondary nodes. The secondary node detects 310 a message, and determines 320 the time of arrival (TOA). If 330 the message is the RREQ message 205, then wait 335 for the RREP message 215 until a timer 370 expires while waiting 360, and start over at step 310.

If 340 the message is the RREP message from the target, then determine 380 whether the corresponding RREQ message 205 has been received. If the RREQ message has been received, then determine 390 the TDOA, and otherwise, discard the RREP message.

If the arriving message is neither the RREQ message nor the RREP message, then process 350 the RDAT message.

Range Estimate

The timing information can be used to make a range estimates. An estimate of the range z between two nodes is based on the round trip time for the RREQ and RREP messages minus the delay at the receiver divided by two, and multiplied by the speed of light. Each range estimate includes an error due to imperfect estimation of the times.

The range estimate z between the $i^{th}$ primary node and target node T, for i=1, . . . , N, uses TW-TOA, which can be expressed as $$z_i = r_i + \frac{n_{T,i}}{2} - \frac{n_{i,T}}{2}, \quad (1)$$

where $$r_i = \sqrt{(x_i - x_T)^2 + (y_i - y_T)^2}$$

a range r is between the $i^{th}$ primary node and the target node T, $n_{i,T}$ is a timing error at the target node induced when the target node estimates the arrival time of a ranging packet, and $n_{T,i}$ is a timing error at the $i^{th}$ primary P node, which is induced when the primary node estimates the arrival time of the reply packet from the target.

The primary node computes the elapsed time between its transmission time of the ranging packet and the reception time of the response packet transmitted by the target, and divides the elapsed time by 2. Thus, the primary node obtains an estimate of the one way flight time. Multiplying the one way flight time by the speed of propagation gives the one way range.

According to the embodiments of invention, there are N primary nodes and M secondary nodes. The primary nodes perform two-way ranging with the target. Hence, the primary nodes provide N measurements using Equation (1). The range estimates by the primary nodes define circles 245 on which the target node can be located. The range estimates by the primary and secondary nodes, in combination, define ellipses 255. The target is located at the intersection of the circles and ellipses.

In addition, the secondary nodes also receive the ranging messages, and thus can provide additional positional information. Specifically, the following M additional measurements, for j=1, . . . , M are obtained:

$$z_i^j = r_i + \tilde{r}_j + \tilde{n}_{i,T,j} - n_{i,T} - \tilde{n}_{i,j}, \quad (2)$$

where $\tilde{r}_j$ is the distance between the target node and the $j^{th}$ secondary node, $\tilde{n}_{i,T,j}(\tilde{n}_{i,j})$ represents the error due to TOA estimation of an arriving ranging packet at the $j^{th}$ secondary node, and $n_{i,T}$ is as described above.

Note that $n_{i,j}$ and $n_{l,k}$ ($\tilde{n}_{i,j}$ and $\tilde{n}_{l,k}$) are independent for $(i,j) \neq (l,k)$; and $n_{i,j}$ and $\tilde{n}_{l,k}$ are independent for $\forall i,j,k,l$. In a network with multi-path channels, the first message is usually received via the most direct signal path. However, in some channels, the first received message may not always have the strongest signal strength.

Therefore, a search backward procedure should be run to determine the time instant the first copy of the RREQ message has been received. Depending on the signal-to-noise ratio and available processing gain, some timing error is induced in the result of the search. The noise parameters in Equations (1) and (2) are used to model such errors.

A vector of distances for the cooperative positioning system according to the embodiments of the invention is $$z = [z_1 \, z_2 \, \ldots \, z_N z_1^1 \, \ldots \, z_1^M \, z_2^1 \, \ldots \, z_2^M \, \ldots \, z_N^1 \ldots z_N^M]^T, \quad (3)$$

where T is the transpose operator. In other words, this observation vector contains N values obtained using (1), and NM values obtained using (2).

In some cases, the messages from the N primary nodes (P) only reach a subset of the M secondary nodes (S)

$$A_i = \{j \in \{1, 2, \ldots, M\} | j^{th} S \text{-and-} i^{th} P\} \quad (4)$$

for i=1, . . . ,N.

Then, the measurements for Equation (3) become $$z = [z_1 z_2 \ldots z_N z_1^{A1(1)} \ldots z_1^{A1(M1)} z_2^{A2(1)} \ldots z_2^{A2(M2)} \ldots z_N^{AN(1)} \ldots z_N^{AN(MN)}]^T, \quad (5)$$

where $A_i(k)$ represents the $k^{th}$ element of $A_i$, and $M_i$ is the number of secondary nodes that can communicate with the $i^{th}$ primary node.

Position Estimation

The above describe positioning does not provide an optimal solution in the presence of noise because it is solely based on geometry, see S. Gezici, "A survey on wireless position estimation," Wireless Personal Communications, Special Issue on Towards Global and Seamless Personal Navigation, vol. 44, no. 3, pp. 263-282, February 2008. Therefore, a statistical approach, such as maximum likelihood estimator, should be used, see G. Sun, J. Chen, W. Guo, and K. J. Ray Liu, Signal Processing Techniques in Network Aided Positioning, IEEE Signal Proc. Magazine, v. 22, n. 4, pp. 12-23, July 2005.

In the current invention the maximum likelihood estimator (MLE) for the target position is derived and implemented. In order to obtain the MLE for the target position, the probability density function (pdf) of vector z in Equation (5) should be obtained first. Note that the components of z are not independent due to presence of the noise terms at the target node, i.e., $n_{i,T}$).

However, conditioned on the noise components, i.e., given $n_T = [n_{1,T} \ldots n_{N,T}]$, the components of z become independent. Hence, the pdf of z can be calculated easily based on the following expression:

$$p_\Theta(z) = \int p_\Theta(z|n_T) f_\Theta(n_T) dn_T \quad (6)$$

where $f_\Theta(n_T)$ is the probability density function of the noise components due to the measurements at the target node. The $f_\Theta(n_T)$ is shown to be Gaussian distributed with zero mean for line of sight links, see N. Patwari, J. N. Ash, S. Kyperountas, A. O. Hero III, R. L. Moses and N. S. Correal, "Locating the nodes: Cooperative localization in wireless sensor networks," IEEE Signal Processing Mag., vol. 22, no. 4, pp. 54-69, July 2005. The MLE solution for the target coordinates is the solution that maximizes the $p_\theta(z)$.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for locating a position of a transceiver, in a cooperative relay network of nodes, comprising:
   broadcasting, by a primary node in the cooperative relay network, a range request (RREQ) message;
   broadcasting, by a target node in the cooperative relay network in response to receiving the RREQ message, a range reply (RREP) message, wherein the RREP message includes a time difference between receiving the RREQ message and broadcasting the RREP message;
   broadcasting, by a secondary node in the cooperative relay network in response to receiving the RREQ message and the RREP message, a range data (RDAT) message, wherein the RDAT message includes a time difference between receiving the RREQ message and the RREP message; and
   determining, in a position solver of the cooperative relay network, a location of the target node based on the time differences in the RREP message and the RDAT message.

2. The method of claim 1, further comprising:
   implementing the position solver in the target node.

3. The method of claim 1, further comprising:
   implementing the position solver in a coordinator node in the cooperative relay network.

4. The method of claim 1, wherein the target node is mobile.

5. The method of claim 1, wherein each message includes a messageType field identifying the message as the RREQ, RREP or RDAT message, a localID field for storing a network address of the primary reference node, a sourceID field for identifying the primary reference node, a targetID for identifying the target node, a sequenceNo field for counting a number of position update requests, and a time difference field for storing the time difference.

6. The method of claim 1, wherein a range estimate z between the primary node and the secondary node is based on a round trip time for the RREQ message and RREP.

7. The method of claim 6, wherein the range estimate is $$z = r + \frac{n_T}{2} - \frac{n_P}{2}, \qquad (1)$$

where $$r = \sqrt{(x_P - x_T)^2 + (y_P - y_T)^2}$$

a range r is between the primary node P and the target node T, $n_T$ is a timing error at the target node, and $n_P$ is a timing error at the primary node.

8. The method of claim 1, wherein the network has multipath channels, and further comprising:
   searching for a first copy of the RREQ message at the target node and a first copy of the RREP message at the primary node.

9. The method Of claim 1, wherein a statistical approach uses a maximum likelihood estimator, which estimates the target coordinates that maximize $p_\theta(z)=\int p_\theta(z|n_T)f_\theta(n_T)dn_T$, where $f_\theta(n_T)$ is the probability density function of noise components due to the measurements at the target node.

10. The method of claim 1, further comprising:
    broadcasting a plurality of RREQ, RREP and RDAT messages over time to track the target node.

11. A system for locating a position of a transceiver, in a cooperative relay network of nodes, comprising:
    a primary node in the cooperative relay network is configured to broadcast, a range request (RREQ) message;
    a target node in the cooperative relay network is configured to broadcast, in response to receiving the RREQ message, a range reply (RREP) message, wherein the RREP message includes a time difference between receiving the RREQ message and broadcasting the RREP message;
    a secondary node in the cooperative relay network is configured to broadcast, in response to receiving the RREQ message and the RREP message, a range data (RDAT) message, wherein the RDAT message includes a time difference between receiving the RREQ message and the RREP message; and
    a position solver of the cooperative relay network determines a location of the target node based on the time differences in the RREP message and the RDAT message.

* * * * *